Patented May 17, 1949

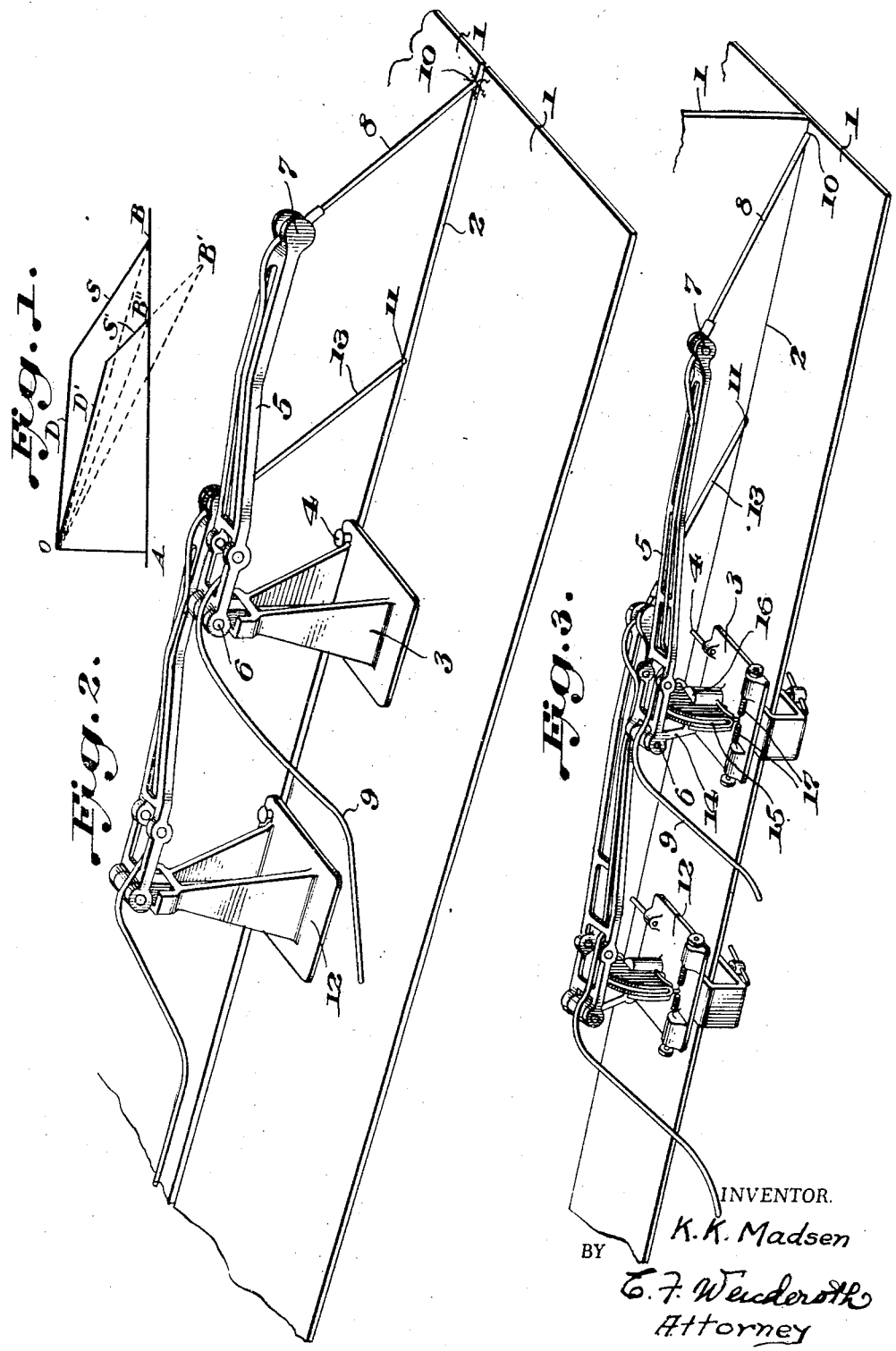

2,470,178

UNITED STATES PATENT OFFICE 2,470,178

SEMIAUTOMATIC ARC WELDING APPARATUS AND METHOD

Karl Kristian Madsen, Lomas de Zamora F. C. S., Argentina, assignor to Aktieselskabet Esab, Copenhagen, Denmark Application December 30, 1947, Serial No. 794,650
In Denmark March 16, 1945

Section 1, Public Law 690, August 8, 1946
Patent expires March 16, 1965

5 Claims. (Cl. 219—8)

The present invention relates to machines for semi-automatic welding with rod-shaped coated electrodes. More particularly, the invention relates to such machines of the general type comprising a frame to rest on the work, a lever pivotally supported by said frame, and electrode holding means supported by said lever at one end thereof to hold an electrode at substantially right angles to the pivot axis of the lever.

The invention also relates to a corresponding process of arc welding which comprises sustaining an electric arc between the tip of rod-shaped coated electrode and a workpiece and displacing the electrode tip along the workpiece by rotating the electrode around a stationary axis extending at substantially right angles to the electrode and to the weld to be formed.

It is the principal object of the invention to provide an improved machine and process of the above kind which will produce a weld or bead of uniform thickness through the length of the weld.

Other objects and features of the invention will become apparent from a consideration of the following specification and claims.

In the drawings,

Fig. 1 is a diagrammatic side elevation of an apparatus according to the invention in two successive positions.

Fig. 2 is a perspective view of two machines according to the invention placed in position for making a butt weld, and Fig. 3 is a perspective view of two machines according to another embodiment of the invention placed in position for producing a fillet weld.

The principle of the invention shall now first be explained with reference to Fig. 1. In said figure, the line A—B represents a workpiece, and D denotes a pivotally supported arm or lever of the axis of rotation O of which extends at right angles to the plane of the figure. A coated electrode S is attached to the arm D so as to form an angle therewith. In operating the device, an electric current is supplied to the electrode S by conventional means not shown so as to sustain an arc between the core of the electrode S and the workpiece. The tip of the electrode core is maintained at arc-striking distance from the workpiece by gravity or by other suitable means. D' and S' designate the arm and the electrode, respectively, in a subsequent position in which a portion B'—B" of the electrode has been consumed.

According to the invention, the angle between the electrode S and the arm D should be such that the line OB from the pivot axis O to the tip B of the electrode when engaging the workpiece forms the bisector of the angle between the electrode and the line AB along which the weld is to be made. Otherwise expressed, the perpendicular distance OA from the pivot axis to said line should be equal to the perpendicular distance from the pivot axis to the longitudinal axis of the electrode. It can be proved by simple geometrical reasoning that, if said condition is fulfilled, the length of electrode consumed for a definite length of weld is always equal to said length of weld. In the illustrated case, the distance B'—B" will therefore be equal to the distance B—B". The method or the apparatus according to the invention therefore always will produce a weld of uniform thickness.

The embodiment illustrated in Fig. 2 comprises a frame or standard 3 and an arm or lever 5 rotatably attached to the frame 3 by means of a pin 6. The free extremity of the lever 5 is provided with a holder 7 by means of which an electrode 8 is attached at such an angle to the lever 5 that the condition according to the invention, as explained above, is fulfilled. A cable 9 serves to connect the electrode to one terminal of a source of current the other terminal of which is, as usually, connected to the workpiece.

The frame 3 is shown to be mounted on one of a pair of plates 1 which are to be connected through a joint 2. A pair of pins 4, only one of which is visible in the figure, serve to define the correct position of the frame with regard to the joint.

To the left of the device just described, there is shown in the figure an exactly similar device 12 supporting an electrode 13 and so positioned that the tip of said electrode 13 is situated at the point 11 where the first electrode 8 will be exhausted. The arc from said first electrode will thus automatically start the arc of said second electrode. As soon as the arc has been struck, the first apparatus may be removed, a fresh electrode clamped in the holder 7, and the apparatus placed in abeyance behind the one now functioning, so that electrode 13 may in its turn be relieved by a fresh one.

To render possible immediate change-over from one electrode to another as just described, the portion of the lever 5 supporting the electrode holder is laterally offset to the portion thereof adjacent to the pin 6, so that the holder and the electrode of the device 13 can project laterally of the stand 3 the inner portion of the lever 5.

Fig. 3 illustrates an apparatus according to another embodiment of the invention mounted in position upon a plate 1 for producing a fillet weld forming part of a joint 2 between said plate and a second plate 1 which is vertical therewith. In Figs. 2 and 3, like numerals refer to like parts, with the exception that the frame 3 of Fig. 3 is of somewhat modified design. The pin 6 is supported by a member 14 which again is mounted in a sector shaped member 15 so as to be angularly adjustable about an axis extending substantially horizontally and at right angles to the pin 6. By this means, the plane in which the electrode 8 rotates may be tilted, as required in the case shown and generally in fillet welding. Furthermore, the member 15 is itself rotatably mounted on a vertical stud 16 so as to admit of lateral adjustment of the position of the tip of the electrode 8. The springs 17 serve to urge the member 15 towards its normal position.

I claim:

1. Apparatus for electric arc welding with rod-shaped coated electrodes, comprising a frame to rest on the work, a lever pivotally supported by said frame, and electrode holding means supported by said lever at one end thereof to hold an electrode at substantially right angles to the pivot axis of the lever, the aforesaid members being so designed and related to one another that the length of the perpendicular from said pivot axis to the longitudinal axis of the electrode is substantially equal to the length of the perpendicular from said pivot axis to the line of intersection between the work on which the frame is supported and the plane of rotation of the electrode.

2. Apparatus as claimed in claim 1, in which the lever is pivotally supported by a member rotatable about an axis extending at right angles to the pivot axis and to the line of intersection aforesaid.

3. Apparatus as claimed in claim 1, in which the portion of the lever supporting the electrode holder is laterally offset to the portion thereof adjacent to the pivot axis, whereby two apparatuses may be placed on a work in such relation to one another that a fresh electrode held in one apparatus extends with its tip into the path of the tip of an electrode mounted in the other apparatus, both electrodes having a common plane of rotation.

4. Apparatus as claimed in claim 1, wherein means are provided for adjusting the angular position of the pivot axis with regard to an axis substantially parallel to the line of intersection aforementioned.

5. The process of arc welding which comprises sustaining an electric arc between the tip of a rod-shaped coated electrode and a workpiece and displacing the electrode tip along the workpiece by rotating the electrode about a stationary axis extending at substantially right angles to the electrode and the weld to be formed, while maintaining the longitudinal axis of the electrode at a perpendicular distance from the stationary axis of rotation aforesaid substantially equal to the perpendicular distance from said axis of rotation to the line along which the weld is to be made upon the workpiece.

KARL KRISTIAN MADSEN.

REFERENCES CITED

The following references are of record in the file of this patent:

UNITED STATES PATENTS

| Number | Name | Date |
|---|---|---|
| 2,204,545 | Faunce | June 18, 1940 |
| 2,370,716 | Carter | Mar. 6, 1945 |
| 2,421,095 | Tyrner | May 27, 1947 |

FOREIGN PATENTS

| Number | Country | Date |
|---|---|---|
| 112,353 | Great Britain | Jan. 10, 1918 |